United States Patent

[11] 3,604,117

| | | |
|---|---|---|
| [72] | Inventor | Helmuth Rolf Erich Von Beckmann<br>Columbia, S.C. |
| [21] | Appl. No. | 807,015 |
| [22] | Filed | Mar. 13, 1969 |
| [45] | Patented | Sept. 14, 1971 |
| [73] | Assignee | Tamper, Inc.<br>West Columbia, S.C. |

[54] APPARATUS FOR RECORDING TRACK ERRORS
4 Claims, 3 Drawing Figs.

[52] U.S. Cl. .................................................. 33/60,
33/144
[51] Int. Cl. ............................................. E01b 29/04
[50] Field of Search .......................................... 33/60, 143, 144

[56] References Cited
UNITED STATES PATENTS
2,832,148  4/1958  Rousse .......................... 33/144
2,962,979  12/1960  McCormick ................. 33/60 X
FOREIGN PATENTS
737,154  6/1966  Canada ......................... 33/60

Primary Examiner—William D. Martin, Jr.
Attorney—Smart & Biggar

ABSTRACT: This invention relates to devices for recording railway track condition, that is to say, surface or alignment condition and has a particular application to alignment condition. A system is provided which comprises a light transmitter mounted on an independent front buggy and which projects an infrared reference beam along the track towards an infrared beam receiver which is mounted on a car for movement along the track. A shadow board is mounted on a frame which may be attached to the car carrying the receiver or which may be mounted on an independent car and positioned between the transmitter and the receiver. The transmitter, receiver and shadow board frame are all referenced to the track. The shadow board is slidably mounted on its frame for outward or inward movement on the frame to hunt about a line of sight drawn between the transmitter and receiver. The hunting motion of the shadow board is controlled from the receiver which acts to drive the shadow board out into the path of the beam when the transmitter is receiving the transmitted beam and to command the shadow board to retract out of the path of the beam when the transmitted light is obscured by the shadow board from the receiver. In this fashion the shadow board is caused to hunt about a deadband datum and to provide with the transmitter and receiver a reference line to which the track condition may be referenced. An electrical or mechanical sensor is provided on the frame to sense the movement of the shadow board relative to the frame and to provide a signal to drive a pen on a moving chart-recording system. The chart is driven from the wheels of the system so that the chart moves along at a speed proportional to the speed of the system movement along the track and the pen traces on the chart a record of the track errors as a function of the shadow board movement from its datum.

INVENTOR
HELMUTH ROLF ERICH VON BECKMANN
By: Smart & Biggar
ATTORNEYS.

APPARATUS FOR RECORDING TRACK ERRORS

BACKGROUND OF THE INVENTION

In the past, track surface and alignment conditions have been indicated by extending a wire reference from a front buggy to a rear buggy on a movable system and between the front buggy and the rear buggy mounting a detector car referenced to the track and provided with physical elements which grasp the wire reference and indicate against a scale the nature of the track condition.

It has also been proposed in the prior art to mount a chart recorder on such a system and have the physical element which contacts the wire reference, drive a stylus, record a trace of the track condition on the chart.

It has further been proposed to provide a track travelling, reference wire carrying, system which has a sensing element thereon referenced to the track and provided with scales, a video tape television camera recording the track condition by comparing the movement of scales on the reference car relative to the reference wire.

Yet a further proposal for recording track surface and alignment condition was to provide a video tape television camera having a reference line inscribed on its optical system and referenced to the track as a whole, a sensing car, carrying scales which were locally referenced to the track, being movable beneath the television camera and providing, by scale movement with respect to the reference line, a video tape record of the track condition.

It is an object of the present invention to provide track condition recording system utilizing light reference systems of known configuration.

SUMMARY OF THE INVENTION

According to the present invention a system for recording errors in track surface of alignment condition comprises a light beam transmitter mounted for movement along the track and referenced thereto; a light beam receiver mounted for movement along the track, referenced thereto, and oriented to receive the transmitted light beam; a shadow board between the transmitter and receiver, mounted on a frame referenced to the track and movable therealong, motor means for driving the shadow board outwardly and inwardly on its frame to hunt, in response to command signals from the receiver, about a line of sight drawn between the transmitter and receiver; means for sensing the movement of the shadow board relative to its frame; and, recorder means operatively connected to the sensing means and referenced to the movement of the system along the track to record the track errors as a function of shadow board movement from a datum.

Preferably the recorder is of the travelling chart-type driven by movement of the system along the track, a pen being connected electrically or mechanically to the means for sensing the shadow board movement and adapted to record a trace on the moving chart.

According to a further feature of the invention the shadow board may be mounted on an independent buggy spaced equidistant from the transmitter and the receiver.

BRIEF DESCRIPTION OF THE DRAWINGS

The following is a description by way of example of one embodiment of the present invention reference being had to the accompanying drawings in which.

DESCRIPTION OF THE PREFERRED EMBODIMENTS

Figure 1:
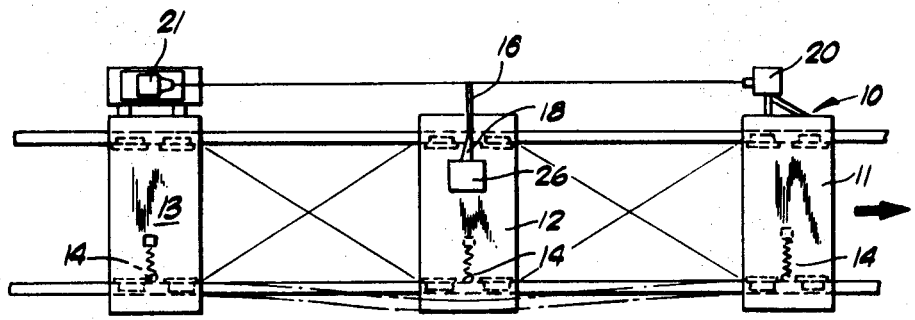
FIG. 1 shows a transmitter, receiver, an intermediate shadow board mounted on independent buggies.

FIG. 1 shows a system, generally designated 10, for recording railroad track horizontal alignment errors. The system comprises a lead buggy 11, an intermediate buggy 12, and a rear buggy 13, each of which is referenced to the track by means of a spring-loaded roller 14 in conventional fashion. It is to be understood that although the intermediate car 12 is shown separated from the rear car 13, it could in fact be part of it, or indeed, the entire system 11, 12, and 13, it could be on a single frame provided that the shadow board 16 is mounted on a frame 18 which is referenced to the track and capable of movement independent of the frame.

At one side of the track and near the rail thereof and fixed at the same spacing from the frames are an infrared beam projector 20 and an infrared beam receiver 21. The intermediate shadow board 16 on its frame 18 is normally positioned at roughly the same distance outwardly of the track as is the transmitter 20 and the receiver 21.

In conventional fashion when aligning tangent track the transmitter is switched on and the receiver is oriented to receive the transmitted beam. The receiver is electrically connected, diagrammatically shown at 25 in FIG. 2, to a drive motor 26 on the shadow board frame 18 which, through a gear train 27, moves the shadow board inwardly and outwardly in guide ways 30 on the frame. Conventionally the motor 26 is controlled by the receiver 21 in such a fashion that when the receiver "sees" the transmission from the transmitter 20 it sends a command signal to the motor 26 to drive the shadow board 16 outwardly of its frame into the path of the transmitted light. As the shadow board moves into the transmitted light and cuts down the quantity of energy received by the receiver 21, the receiver sends a signal to the motor 26 to reverse its drive and retract the shadow board inwardly of its frame out of the path of the transmitted light. The shadow board can be arranged to hunt in this fashion about a small allowable differential or deadband. When the track is out of alignment to the right, as indicated in exaggerated fashion in dotted lines in FIG. 1, the intermediate car will, since it is referenced to the track, move out of alignment with the transmitter 20 and the receiver 21 and the shadow board 16 will have to be extended outwardly of its frame by an extent corresponding with the magnitude of the kink before it will intercept the transmitted beam. Similarly if the misalignment is in the opposite sense, the shadow board 16 will have to be retracted on its frame by an amount equivalent to the magnitude of the amplitude of the kink in order to withdraw the shadow board 16 sufficiently out of the transmitted beam to cause the receiver to once again "see" the transmission.

Figure 2:
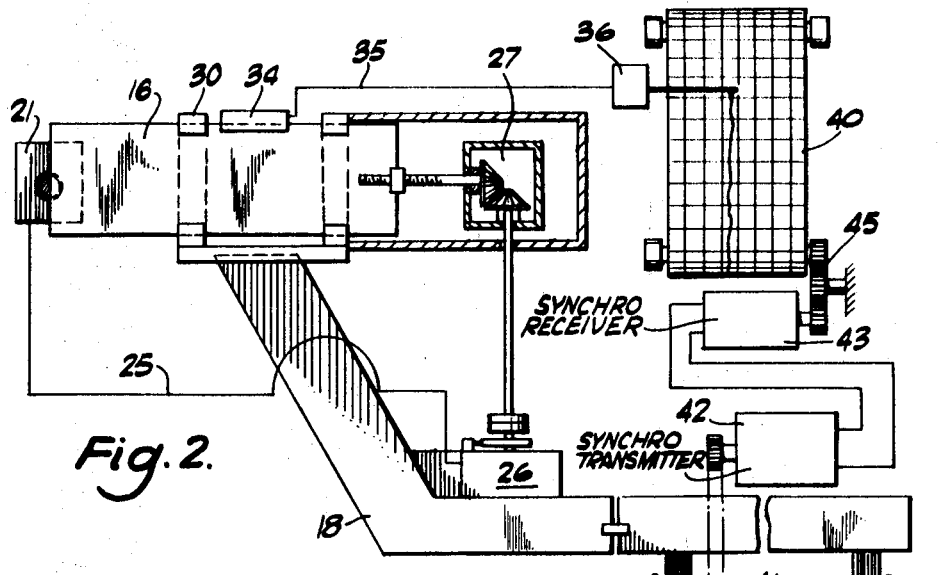
FIG. 2 is a diagrammatic representation of the manner in which the shadow board is operatively connected to a travelling chart type of recorder.

In FIG. 2 a battery excited potentiometer is mounted on the shadow board 16, the wiper thereof (not shown) being connected to the frame so that movement of the shadow board 16 inwardly and outwardly of its frame 18 on its guide 30 causes the electrical signal of a voltage proportional to the movement to be transmitted on line 35 to operate the stylus 36 on a chart recorder 40 in conventional fashion. The chart on the chart recorder is driven in conventional fashion by means of say, a chain 41 connected to a wheel 46 of the intermediate car 12 which chain may be arranged to drive a synchro transmitter 42 so that the electrically connected synchro receiver 43 may drive the chart through the gear train 45.

In this fashion the chart 40 is moved at a speed proportional to the movement of the system along the track and the stylus 36 records a trace on the chart 40 of the track horizontal alignment condition, as a function of the movement of the shadow board 16 picked up and transmitted by the potentiometer 34.

Although the potentiometer 34 and electrical connections 35 to the stylus 36 have been shown, it is to be understood that, equally well, a mechanical linkage could be provided to drive the stylus as a function of shadow board movement.

Figure 3:
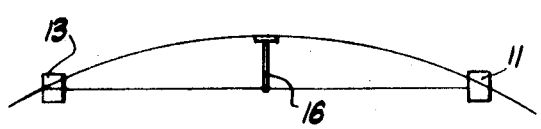
FIG. 3 is a diagrammatic illustration of the system arranged for a "string-lining" operation.

In FIG. 3 the condition for "string-lining" curves by the midordinates method is diagrammatically illustrated, the front buggy 11 being spaced from the rear buggy 13 by a distance equal to 33 feet, the shadow board is arranged in the middle equidistant from the transmitter and the receiver, and the shadow board 16 is pre-extended by an amount proportional to the degree of curvature so that in its extended position the shadow board hunts about a line of sight between the transmitter 11 and the shadow board 13 exactly as it does in a tangent track situation but that line of sight is spaced outwardly of the track.

The present invention has the advantage that existing light systems in aligning track can be used to provide a record of the track condition by connecting the shadow board to a recording device.

Of course, it will be appreciated that other forms of "stringlining" operations can be performed with the present invention in which the configuration of the system could have the shadow board at a spacing other than equidistant. Such spacing could be any predetermined one, as long as it is a fixed one.

I claim:

1. A system for recording errors in railroad track condition comprising a light beam transmitter mounted for movement along and referenced to the track; a light beam receiver mounted for movement along and referenced to the track and oriented to receive the transmitted light beam; a shadow board between the transmitter and receiver, mounted on a frame referenced to the track and movable therealong; a drive motor for driving the shadow board outwardly and inwardly on said frame; electrical connections between said receiver and said drive motor, said receiver being adapted to transmit a command signal to said drive motor to actuate it to drive the shadow board in one direction or another to hunt about a line of sight between transmitter and receiver; motion detection means on said frame for detecting the motion of the shadow board and producing a signal which is a function of that motion; and recorder means adapted to receive this signal to drive a stylus and produce a trace of track errors as a function of shadow board movement from a datum.

2. A Apparatus as claimed in claim 1 wherein the recorder is of the travelling chart type driven by movement of the system along the track, a recording pen being connected to the means for sensing the shadow board movement and adapted to record a trace on the moving chart.

3. A system as claimed in claim 1 in which the transmitter, shadow board and receiver are all located on the same side of the track near the rails thereof and spaced transversely outwardly from the track, the shadow board being arranged to move transversely of the track on its frame, whereby to record errors in track horizontal alignment condition.

4. Apparatus as claimed in claim 3 in which the shadow board is mounted on an independent buggy spaced equidistant from the transmitter and the receiver.